July 4, 1939.          J. M. CHRISTMAN          2,164,572
TOOL
Filed Dec. 10, 1936
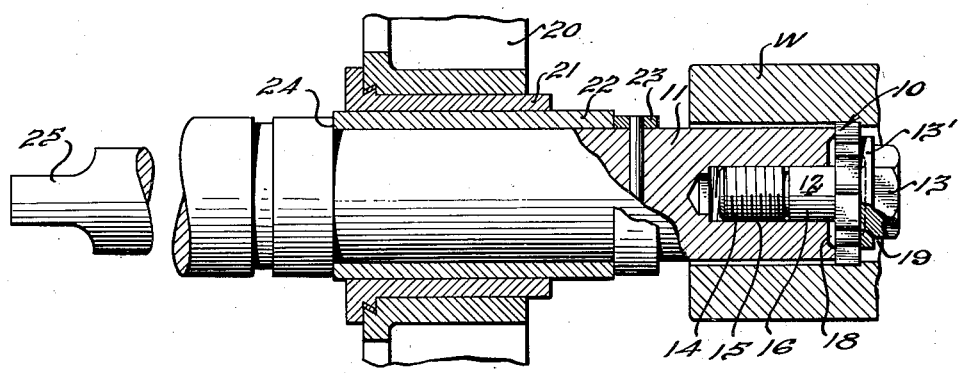
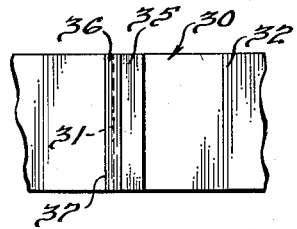
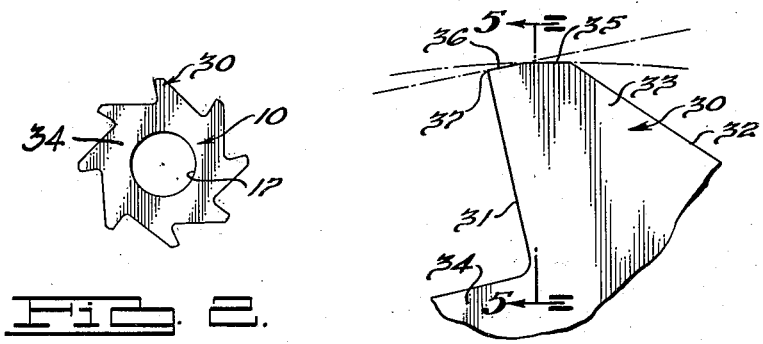
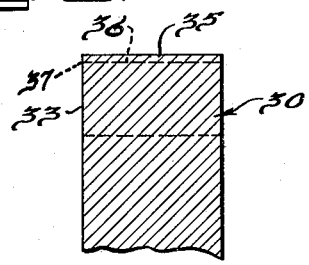
INVENTOR.
John M. Christman.
BY Tibbetts & Hart
ATTORNEYS.

Patented July 4, 1939

2,164,572

UNITED STATES PATENT OFFICE 2,164,572

TOOL

John M. Christman, Detroit, Mich., assignor to Packard Motor Car Company, Detroit, Mich., a corporation of Michigan Application December 10, 1936, Serial No. 115,098

13 Claims. (Cl. 77—58)

This invention relates to tools and more particularly to cutting tools for changing a circumferential dimension of a piece of work.

My Patent No. 2,087,231 issued July 20, 1937, and my application Serial No. 110,827, filed November 14, 1936, are directed to cutting tools for forming the inner and outer circumference respectively of pieces of work. Such tools utilize cutting edges on the ends of the teeth and such edges are formed to extend normal to the tool axis and with the lands formed to lie in a circle struck from the tool axis. For many purposes the circumferential surface formed by this type of cutting tool is sufficiently smooth but there are times when another operation is required to provide a still smoother finished surface. In such event a separate finishing operation with another form of tool must be made after the cutting operation.

It is an object of this invention to reduce the manufacturing cost of obtaining a smooth circumferential surface on a piece of work.

Another object of this invention is to provide a cutting tool of the character described that will also polish a circumferential surface.

Another object of the invention is to provide a tool that will cut a piece of work to change its circumferential dimension and also burnish such newly formed surface during the same tool operation.

Other objects of the invention will appear from the following description taken in connection with the drawing, which forms a part of this specification, and in which:

Fig. 1 is a view, partly in section, of a tool constructed in accordance with my invention and in operating relation with a piece of work;

Fig. 2 is a side view of the cutter or cutting member of the tool shown in Fig. 1;

Fig. 3 is a very much enlarged side view of a segment of the cutting member shown in Fig. 2;

Fig. 4 is a top view of the segment of the cutting member shown in Fig. 3;

Fig. 5 is a sectional view of the cutting member taken on line 5—5 of Fig. 3.

Referring to the drawing, the cutter or cutting member of the tool is indicated generally at 10 and is preferably in the form of an annulus. The cutter is mounted upon a bar or support 11 as by bolt 12, the bolt having a hex head 13 in contact with the cutter and a threaded portion 14 screwed into the threaded portion 15 of the support. The bolt 12 also has a smooth cylindrical portion 16 fitting closely in a similar portion of the support and extending through a cylindrical opening 17 in the cutting member 10. The bar or support 11 immediately back of the cutter 10 extends well out on the teeth of the cutter to give them support and to get as large a radius of contact with the cutter as possible for driving the cutter without keying it thereto. To insure full contact near its periphery, the cutter face of the bar 11 is relieved slightly as shown at 18. For the same purpose the bolt head 13 is undercut as at 19, and in order that clearance may be provided for the chips, which curl or move forward with this cutter, the bolt head 13 is smaller in diameter at its flange 13' than is the bar 11 on the other side of the cutter, and still smaller at the hex portion.

With this construction it will be seen that not only is the cutter 10 centered upon and adapted to be secured to the support, but if the bolt 12 is not originally tightened to the required degree the first cutting operation of the tool will cause the bolt to thread into the bar and automatically tighten the cutter on its support. With this construction the cutter is equally clamped at all points, it is more easily applied to the support than would be the case if a key or spline was used, and since no keyway is formed in the cutter and the cylindrical opening 17, the spaces or flutes between the teeth are the only cutaway parts of the tool. The cutter is therefore not distorted or broken as it would be with a keyway, and it will not go out of round and be weakened by unequal or notched body form, also the cost is less.

Work upon which the boring tool is operating is indicated at W, and the tool is shown as reaming out stock around a hole that has already been formed in the work.

A carrier 20 is provided for the support 11 and this carrier has a sleeve 21 in which is slidingly telescoped a sleeve 22. A pinned collar 23 retains the sleeve 22 on the support 11 against the shoulder 24. The support bar 11 is formed at its opposite end with a driving shank 25 by which it may be rotated and moved endwise, into and through the piece of work.

The cutter or cutting member 10 consists of a body from which extends teeth, the form in this instance being an annulus or disk which is of a width preferably about one-fifth or one-sixth its diameter. It may be even thinner than this, depending largely upon how it is to be made, that is, whether by stamping it out of sheet metal or by forming it from a bar. The cutter may be made by boring a metal bar and then cutting or rolling the teeth from the bar, and then cutting the individual disks from the bar. If the teeth of the cutter are to be formed in the disk after stamping or cutting, several of them may be mounted together on a bar and cut at one time. The teeth are preferably similar and may be evenly spaced or a slight unevenness may be effected to prevent chatter during engagement with work pieces.

The shape of the teeth of this cutter is best illustrated in Figs. 3, 4 and 5 wherein a tooth is shown greatly enlarged. In this form of the invention the teeth form the outer circumference of the annulus and they extend the entire width of the cutter, that is the entire axial length thereof. The teeth are preferably similar in conformation relatively and throughout their length.

The cutter tooth is indicated at 30 and its form is defined by the sides 31, 32, the ends 33 and the peripheral surface, or land, between the sides 31 and 32. The junctions formed by one end of the teeth and the leading side 31 provide cutting edges for removing stock from work. It is the formation of these cutting edges and the lands of the teeth that is of importance in this tool. In the present invention the ends of the teeth are ground normal to the axis of the annulus with the cutting edges of the teeth in the same plane normal to the axis of the cutter so that the end faces of each tooth will press equally against the work when engaged therewith. The entire surface 34 at each axial end of the cutter, including the teeth ends 33, is preferably ground in a plane normal to the axis annulus and this permits a single surface grinding operation in forming the cutting edges of the teeth.

The land, or peripheral surface of each tooth, lies between the sides 31 and 32. The rear portion 35 of each tooth land is formed to lie in a circle struck from the cutter axis and such portions are ground while the cutter is being rotated on its axis. The forward or leading portion 36 of each tooth is slightly relieved circumferentially, that is in a radial direction, and lies within the circle defined by the rear land portion 35. The entire land surface of each tooth is preferably first ground to lie in a circle and then the forward portion of the lands are ground lengthwise to provide the relieved surfaces 36. These surface portions 36 are shown to extend in straight lines, that is inwardly of the circle defined by the surfaces 35. The extent of the relief of surface 36 in Figs. 3 and 5 is greatly exaggerated for the purpose of clear illustration, but in actual practice this relief needs to be only one-thousandth (.001) of an inch or less at the leading side of each tooth.

The cutting corner 37 of each tooth cutter is thus formed with a flat end surface extending normal to the cutter axis and the leading and peripheral surface of the teeth at such corners form angles lying within a circle defined by the peripheral portions 35 of the teeth. The cutting edges are formed by the junction between the forward ends 33 of the teeth and the leading sides 31 thereof, and the length of the cutting edge utilized depends upon the thickness of metal being cut away. The peripheral surfaces 36 and 35 of the teeth do not cut but serve to press outwardly the surface just formed by the cutting edges, and the rotation and feed of the tool causes these surfaces 36 and 35 to rub against the work in a manner causing burnishing. Obviously the surfaces 36 perform the main burnishing operation while the surfaces 35 serve mainly to polish the burnished surface. As a result of this treatment by the cutter, the surface formed in the work during each operation of the tool will be of desired dimension and will have a smooth finish. By utilizing the cutting tool to perform a burnishing operation, grinding now required to produce a polished surface after the cutter has changed a circumference can be eliminated.

The form of tooth herein described can be inserted and used with cutters of the type to which my application Serial No. 110,827, filed November 14, 1936, is directed, however, in this instance the leading portion of the lands is relieved radially outwardly instead of inwardly as in the type of cutter previously described. In such use the outer circumference on a piece of work can be finished in the same manner as the inner surface of a piece of work as herein described.

It will thus be seen that this invention provides low cost cutting and finishing of surfaces on work. The cutter herein described can be manufactured at low cost and can be resharpened by grinding the working end normal to the axis.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. A rotary tool comprising an annulus having one circumference formed with similar teeth each having two sides and a peripheral face and extending the entire axial length thereof, the junction of the leading sides and the ends of said teeth at one end of the tool forming cutting edges and the leading portion of the peripheral faces of the teeth being relieved radially providing surfaces for burnishing the wall formed by the cutting edges.

2. A tool adapted to be rotated and moved axially while rotating comprising a body having circumferential teeth extending the axial length thereof, the following portion of the peripheral faces of said teeth lying in a circle struck from the body axis and the portion of the peripheral face of the teeth in advance of said following portion extending inwardly of said circle and forming burnishing surfaces.

3. In a tool, a cutting tooth having two sides and a peripheral face, said face having its following portion lying on a circle struck from the tool axis and its leading portion extending in a straight line within the circle on which the following portion lies and forming a burnishing surface.

4. A tool adapted to be rotated and moved axially relative to work comprising an annulus having teeth extending the entire axial length thereof, said teeth having two sides and a top with the leading portion of their top relieved radially.

5. A tool having a cutting tooth with two sides and a top, the top comprising a following portion lying in a circle struck from the tool axis and a leading portion relieved to lie radially off of the circle on which the following portion lies.

6. A rotary cutter comprising a metal disk having peripheral teeth extending longitudinally of its axis, said disk having on its leading end a surface wholly in one plane to form with the tooth walls, cutting edges at the junction with one side of each of said teeth, the peripheral surface of each tooth between its sides having a following portion lying on a circle struck from the disk axis and a leading portion lying within such circle.

7. A rotary cutter comprising a cylindrical member having teeth formed on the peripheral surface and extending in an axial direction, the cutting edges of said teeth being disposed in a plane normal to the cutter axis and formed without relief and the lands at their leading portion being formed closer to the tool axis than their following portion.

8. A rotary cutting tool for finishing a cylindrical work surface to the effective diameter of the tool by relative axial displacement of the tool and work, comprising a disk having an axial opening therethrough, thereby providing internal and external surfaces, one of said surfaces having flutes forming teeth spaced thereabout, said teeth being provided at their leading ends with flat surfaces and substantially radially extending cutting edges, and the leading portion of the peripheral faces of said teeth being slightly relieved behind the leading side.

9. A tool adapted to be rotated and moved axially while rotating comprising a body having circumferential teeth extending the axial length thereof, said teeth having radially extending edges formed by the forward ends and the leading sides thereof, the following portion of the peripheral faces of said teeth lying in a circle struck from the body axis and the portion of the peripheral faces of the teeth in advance of said following portion extending inwardly of such circle and forming burnishing surfaces.

10. A rotary tool having a cutting tooth comprising two sides and a top, the top being substantially cylindrical in shape except at its leading end which is cut inwardly slightly in a radial direction.

11. A rotary tool tooth extending radially from a body and comprising sides, ends, and a top with a cutting edge at the leading end, the top of the tool at the leading end being closer to the tool axis than at the following end.

12. A method of enlarging a circular opening in a metal workpiece comprising the steps of reaming a circular layer of material from the workpiece to thereby enlarge the surface bounded by the circular opening, and further enlarging the opening by pressure immediately following the reaming step, the steps occurring simultaneously except at each end of the opening in the workpiece 13. A rotary tool having a cutting tooth with a leading and following portion, the leading portion of said tooth being closer to the tool axis than the following portion.

JOHN M. CHRISTMAN.